(12) United States Patent
Donzis et al.

(10) Patent No.: US 11,601,726 B2
(45) Date of Patent: *Mar. 7, 2023

(54) SYSTEM AND METHOD FOR SET-TOP-BOX MESSAGING DISPLAY

(71) Applicant: PERFTECH, INC., San Antonio, TX (US)

(72) Inventors: Lewis T. Donzis, San Antonio, TX (US); Henry M. Donzis, San Antonio, TX (US); Peter W. Baron, San Antonio, TX (US); John A. Murphy, San Antonio, TX (US); Jonathan E. Schmidt, San Antonio, TX (US)

(73) Assignee: PERFTECH, INC., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/695,709

(22) Filed: Mar. 15, 2022

(65) Prior Publication Data

US 2022/0210519 A1 Jun. 30, 2022

Related U.S. Application Data

(63) Continuation of application No. 17/235,849, filed on Apr. 20, 2021, now Pat. No. 11,288,671, which is a continuation of application No. 16/854,881, filed on Apr. 21, 2020, now Pat. No. 10,986,417, which is a continuation of application No. 16/445,082, filed on Jun. 18, 2019, now Pat. No. 10,631,062, which is a continuation of application No. 15/607,504, filed on May 28, 2017, now Pat. No. 10,327,038, which is a continuation of application No. 12/340,879, filed on Dec. 22, 2008, now Pat. No. 9,668,027.

(51) Int. Cl.
*H04N 21/488* (2011.01)
*H04N 21/422* (2011.01)
*H04N 21/442* (2011.01)

(52) U.S. Cl.
CPC ... *H04N 21/4882* (2013.01); *H04N 21/42204* (2013.01); *H04N 21/44213* (2013.01)

(58) Field of Classification Search
CPC ......... H04N 21/4882; H04N 21/42204; H04N 21/44213
See application file for complete search history.

(56) References Cited

U.S. PATENT DOCUMENTS

| | | |
|---|---|---|
| 2004/0103167 A1 | 5/2004 | Grooters et al. |
| 2004/0117843 A1 | 6/2004 | Karaoguz et al. |
| 2005/0216943 A1 | 9/2005 | Rodolico |
| 2006/0179466 A1 | 8/2006 | Pearson et al. |
| 2007/0168430 A1 | 7/2007 | Brun et al. |
| 2010/0138858 A1 | 6/2010 | Velazquez et al. |
| 2010/0184484 A1 | 7/2010 | Lindberg et al. |

*Primary Examiner* — Michael R Telan

(57) ABSTRACT

In a set-top-box system, messages from a service provider are stored and delayed until activity from a set-top-box remote is detected. Messages are then generated and provided to a television associated with the set-top-box. Delaying of the message display until set-top-box activity is detected allows short display times, thus preventing burn-in on some television screens, while providing a greater likelihood that messages will be viewed.

20 Claims, 3 Drawing Sheets

SYSTEM AND METHOD FOR SET-TOP-BOX MESSAGING DISPLAY

FIELD OF THE INVENTION

This disclosure relates to set-top-boxes for providing display signals to displays such as televisions and the like. In particular, the disclosure relates to providing messages, e.g. service messages from a service provider, from a set-top-box to a television.

BACKGROUND OF THE INVENTION

Most of the recent generation of cable TV deployments utilize television set-top boxes that are also capable of receiving targeted text messages from the provider that are then displayed on the screens of the televisions associated with the boxes on the identified accounts.

An existing facility that incorporates on-screen messaging, and in many systems the only targeted on-screen messaging service in use, is the display of the Caller ID of incoming telephone calls to the cable company-provided telephone service usually associated with the same account. This application displays information for a very short time, typically less than a minute, and is not critical if it is not viewed, if the television is not turned on, or the viewer is not watching for any reason.

Other TV screen-based communications from the providers to their subscribers can be useful but, in most cases, these messages would be more critical and, to be assured of being viewed, would be displayed until the customer responds through a remote control action. Such messaging includes targeted and scheduled communications for customer care information, announcements of planned maintenance outages, announcements of new services that apply to the particular plan into which targeted accounts are enrolled, problems associated with the account (billing, etc.), and more.

The open loop arrangement by which the set-top box and associated television are interconnected (the set top box frequently has no signal that the television is powered off or has its input switched to another source such as a DVD player) causes a significant problem in the use of set-top box messaging for several critical situations. The television may be turned off or switched to another source and the to-be-displayed message from the set-top box will be presented to the unresponsive television and, therefore, will not be viewed. Alternatively, the television may be turned on and switched to the set-top box source but unwatched for, perhaps many hours, leaving the message unviewed.

Long term display of fixed information, such as text messages on the screen, will, in many types of televisions, cause burn-in where the text area becomes diminished in brightness for normal images and discolored and visible when the set is turned off. Consequently, the image cannot be left displayed for any significant length of time.

The set-top box remote control functions typically permit the viewer to cancel displayed messages. Thus, the message cannot remain displayed for very long while awaiting the viewer's response. When multiple messages are due for viewing by the targeted subscriber, the problem is compounded.

The above described problems have been recognized. Current solutions include a "message light", an indicator that is located on the set-top box, itself. The subscriber then has an activation sequence on the remote control that will force the message onto the screen for viewing, that is, if the indicator is noticed and the remote control activated. The subscriber can re-activate the message viewing if the indicator remains on after viewing the first message in order to access additional messages. The deactivation of the display can be used as an acknowledgement that the message has been read.

Message flags implemented as indicators on set-top boxes are easily overlooked. Set-top boxes are often not oriented so that the indicator is visible. Cable subscribers often are not aware of the meaning of this additional indicator on the front panel of the set-top box.

What is required is an improved system and method for set-top-box messaging display.

SUMMARY OF THE INVENTION

In one aspect of the disclosure, there is provided a method for providing display of set-top-box messages onto a display. The method comprises receiving at least one message to be displayed into a set-top-box and detecting activity of a remote associated with the set-top-box. The at least one message is provided to the display in response to the remote activity.

In one aspect of the disclosure, there is provided a set-top-box comprising at least one memory, a remote interface and at least one processor. The memory stores message content from a service provider. The remote interface receives control signals from at least one remote. The processor generates a display message comprising the message content and provides the display message to a television. The display message is provided to the television in response to detection of remote activity at the remote interface.

In one aspect of the disclosure, there is provided a computer-readable medium comprising computer-executable instructions for execution by a processor, that, when executed, cause the processor to detect activity from a set-top-box remote, generate a display message in response to the detected remote activity, and provide the display message to a television.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
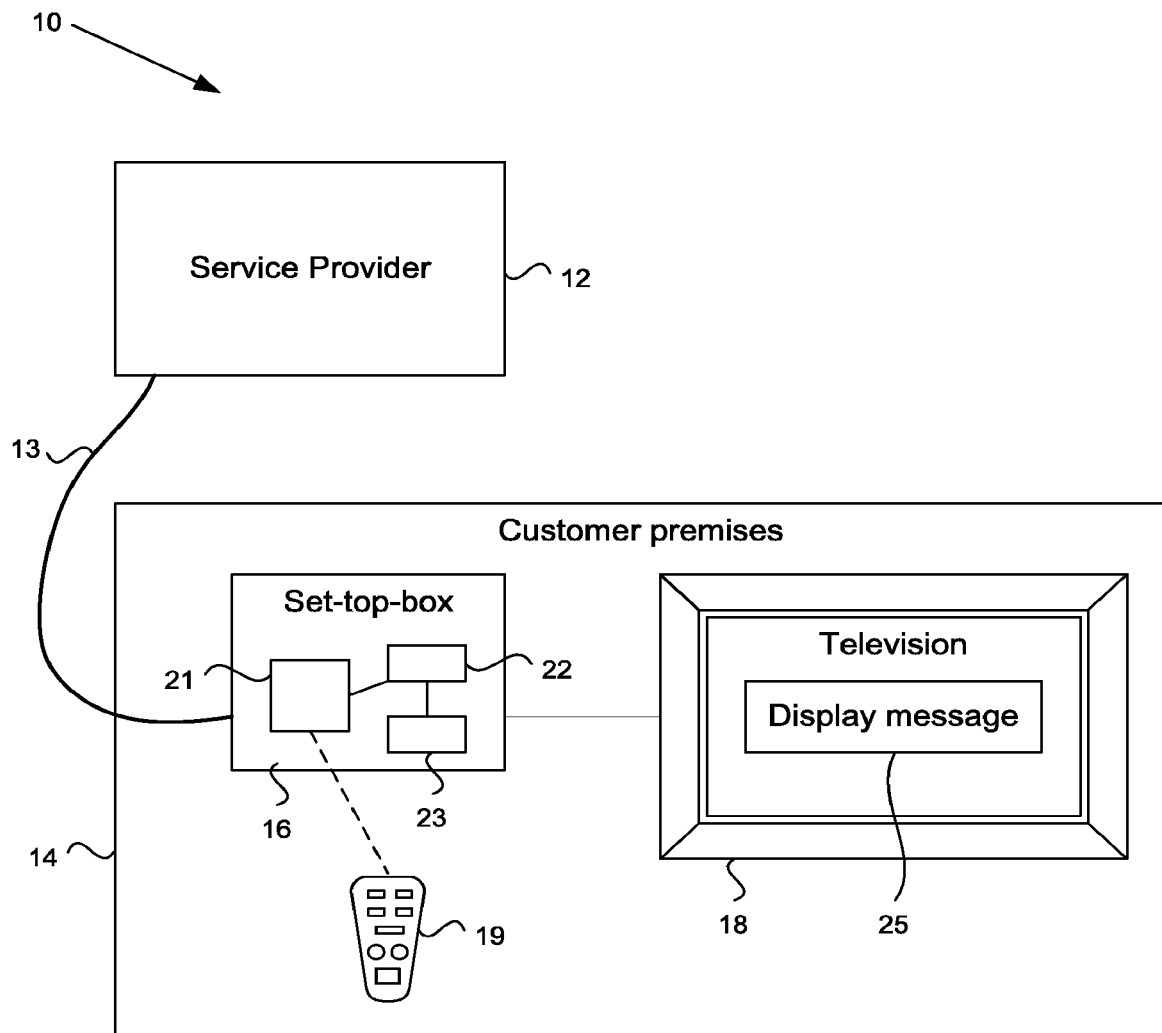
FIG. 1 schematically illustrates a cable service system.

In FIG. 1, there is shown a cable service 10 including a cable service provider 12 providing cable service through a cable 13 to a subscriber premises 14. A set-top-box 16 at the subscriber premises 14 decodes signals from the cable service provider 12 for providing to a display 18, such as a television, digital projector, etc. A remote 19 is used for controlling the television 18 and set-top-box 16. While a single remote 19 is shown, a person skilled in the art will readily understand that separate remotes may be provided for each of the set-top-box 16 and television 18 as well as peripheral devices (not shown) such as DVD players, hard disk drive (HDD) recorders etc.

The set-top-box 16 includes a remote interface 21 for receiving control signals from the remote 19. The set-top-box also includes a processor 22 and memory 23.

Figure 2:
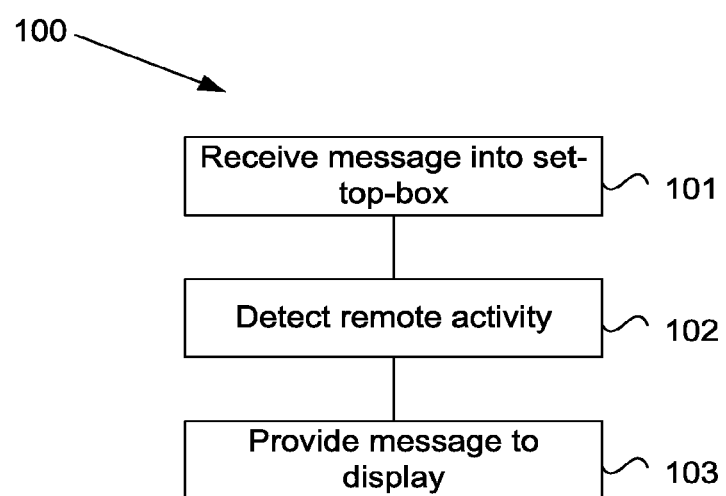
FIG. 2 illustrates a flowchart for providing set-top-box messages.

A method for providing on-screen display of set-top-box messages in the cable service 10 will now be described with additional reference to the flowchart 100 of FIG. 2. At step 101, a message for display on the display screen 18 is received into the set-top-box 16 from the service provider 12. At step 102, manual activity of a remote associated with the set-top-box is detected, in response to which, the set-top-box 16 causes display of the message 25 on the display screen 18 (step 103).

Figure 3:
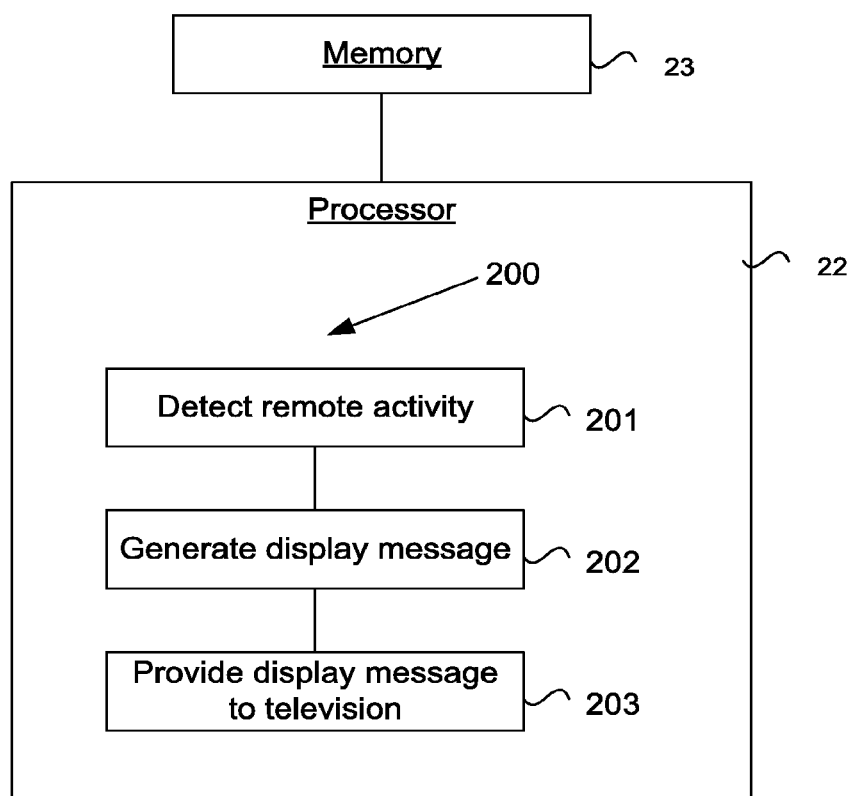
FIG. 3 illustrates a processor and memory executing an instruction set.

The processor 22 and memory 23 are shown in more detail in FIG. 3. The memory 23 may include a read-only memory (ROM) that stores program instructions executable by the processor 22. The memory 23 may also include a random access memory (RAM) that may store message content received into the set-top-box 16 from the service provider 12 while the set-top-box 16 is awaiting activity from the remote 19. In one embodiment, the program instructions may include an instruction set 200 that causes the processor to detect activity from the remote (step 201), generate a display message (step 202), e.g. by retrieving message content from the memory 23 and then provide the display message to the television (step 203).

The detection of activity of the remote control for set-top box functions is a significant indicator that a viewer is watching the screen of a powered-on television with the set-top box as the video source. A temporary on-screen display of a set-top-box-generated message is invoked upon detecting manual activity of the remote control for the set-top-box functions.

In one embodiment, the set-top-box may be configured to control the display period of a message. For example, the set-top-box may cause the display of the message until it is acknowledged by an intentional remote control action or until a maximum time period has elapsed. The maximum time period may be chosen to prevent burn-in of the message on the display. In one embodiment, the set-top-box may cause the message to be displayed periodically until the acknowledgement is received. If the message is not acknowledged within a predetermined period of time, e.g. 60 seconds, the message will disappear and then redisplay after another period of time, e.g. 2 minutes, and after subsequent activity of the remote control. The message may thus continually reappear until it is acknowledged or until a validity period for the message has expired. Requiring the message to be manually acknowledged will increase the likelihood that it will be read and understood.

In the case that multiple messages are intended for display, the messages can be displayed in sequence or in an order determined by a priority. Priority may be indicated by the service provider, with the order of equal priority messages being determined by the order in which the messages are received into the set-top-box.

The time for which a message is displayed, in particular without user acknowledgement, is chosen to be long enough that it may gain the attention of the viewer but short enough as to not cause burn-in problems with the screen. The short display time of the messages decreases the probability that the viewer will be irritated, yet serves to ensure that important notifications are properly viewed. In one embodiment, the message is displayed for between approximately 30 seconds and 3 minutes or until user acknowledgement is received through remote 19.

The content of the message may inform the viewer of the actions required and the behavior of the redisplay.

In one embodiment, the display of the message may not necessarily occur immediately upon remote control activity but may be more conspicuous if delayed some seconds after remote control activity has been quiescent. Thus, the processor 22 may detect a period of quiescence of the remote interface after an initial activity period and only after the remote has been inactive for a period, e.g. 5 seconds, does the processor 22 provide the display message to the display.

In one embodiment, the activity-triggered display of generated messages can be combined with time-of-day parameters to target different classes of family members. Highly critical messages can be targeted to all set-top boxes in an account.

In one embodiment, highly critical messages can be redisplayed repeatedly until a code is entered that may only be accessible by the account holder such as the account number from the monthly bill or the last four digits of a shared number such as a credit card.

The embodiments described herein provide advantage by being able to overcome the problems associated with the current mechanisms specifically in the area of immediacy of visibility combined with protection of television screens from "burn in" phenomena.

The described methods overcome the problems of inconspicuous on-box indicators by causing on-screen display of messages without burn-in problems by invoking a temporary display only upon any activity of the remote control for the set-top box and by sequencing through multiple messages, if any, as long as activity continues on the remote control.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
providing a plurality of messages to a display in response to detected remote activity of a remote associated with a set-top box and after a period of quiescence of a remote interface that begins after a detected initial activity of the remote and continuing for a predefined period of time after the detected initial remote activity has ended, wherein at least one message having a higher message priority than the other of the plurality of messages is displayed before the other of the plurality of the messages; and periodically providing the at least one of the plurality of messages to the display for a first time period, and removing the at least one of the plurality of messages from the display for a second time period which is a longer time than the first time period, until additional activity of the remote is detected and an acknowledgement signal is received in the set-top-box from the remote.

2. The method of claim 1, further comprising detecting activity of the remote by receiving a signal from the remote in the set-top-box.

3. The method of claim 1 wherein, the signal comprises a control signal for at least one set-top-box function.

4. The method of claim 1, further comprising receiving the plurality of messages in a memory of the set-top-box.

5. The method of claim 1, wherein a sequence of the plurality of messages is designated by a service provider.

6. The method of claim 5, wherein the plurality of messages are received from the service provider.

7. The method of claim 1, further comprising storing the plurality of messages in the memory of a set-top-box until activity of the remote is detected.

8. The method of claim 1, wherein content of at least one of the plurality of messages displayed comprises actions required.

9. The method of claim 1, wherein a sequence of the plurality of messages is determined by an order in which the plurality of messages are received into the set-top-box.

10. The method of claim 1, further comprising establishing the first time period during which at least one of the plurality of messages are displayed and the second time period during which the at least one of the plurality of messages are removed from being displayed.

11. The method of claim 1, wherein the least one message is redisplayed until a confirmation code is received indicating the at least one message has been acknowledged.

12. A set-top-box, comprising:
a remote interface that receives control signals from at least one remote; and
at least one processor that:
provides a plurality of messages to a display in response to detected remote activity of a remote associated with a set-top-box, and after a period of quiescence of a remote interface that begins after a detected initial activity period of the remote and continuing for a predefined period of time after the detected initial remote activity has ended, wherein at least one message having a higher message priority than the other of the plurality of messages is displayed before the other of the plurality of the messages; and
periodically provides the at least one of the plurality of messages to the display for a first time period and removes the at least one of the plurality of messages from the display for a second time period which is a longer time than the first time period, until additional activity of the remote is detected and an acknowledgement signal is received in the set-top-box from the remote.

13. The set-top-box of claim 12, wherein a memory stores message content until activity of the at least one remote is detected.

14. The set-top-box of claim 12, wherein the at least one processor provides the plurality of messages to the display.

15. The set-top-box of claim 12, wherein the at least one processor establishes the first time period during which at least one of the plurality of messages are displayed and the second time period during which the at least one of the plurality of messages are removed from being displayed.

16. The set-top-box of claim 12, wherein content of at least one of the plurality of messages displayed comprises actions required.

17. A non-transitory computer-readable storage medium comprising computer-executable instructions for execution by a processor, that, when executed, cause the processor to:
provide a plurality of messages to a display in response to detected remote activity of a remote associated with a set-top-box, and after a period of quiescence of a remote interface that begins after a detected initial activity period of the remote and continuing for a predefined period of time after the detected initial remote activity has ended, wherein at least one message having a higher message priority than the other of the plurality of messages is displayed before the other of the plurality of the messages; and
periodically provide the at least one of the plurality of messages to the display for a first time period and remove the at least one of the plurality of messages from the display for a second time period which is a longer time than the first time period, until additional activity of the remote is detected and an acknowledgement signal is received in the set-top-box from the remote.

18. The non-transitory computer-readable storage medium of claim 17 comprising computer-executable instructions for execution by the processor, that, when executed, cause the processor to store the plurality of messages in a memory of the set-top-box until the remote activity of the remote is detected.

19. The non-transitory computer-readable storage medium of claim 17 comprising computer-executable instructions for execution by the processor, that, when executed, cause the processor to establish a first time period during which at least one of the plurality of messages are displayed and a second time period during which the at least one of the plurality of messages are removed from being displayed.

20. The non-transitory computer-readable storage medium of claim 17, wherein content of at least one message of the plurality of messages displayed comprises actions required.

* * * * *